(12) United States Patent
Piech et al.

(10) Patent No.: US 9,719,569 B2
(45) Date of Patent: Aug. 1, 2017

(54) BRAKE FOR ELECTRIC MOTOR

(75) Inventors: Zbigniew Piech, Cheshire, CT (US);
Kyle W. Rogers, Somerville, MA (US);
Daryl J. Marvin, Farmington, CT (US)

(73) Assignee: OTIS ELEVATOR COMPANY,
Farmington, CT (US)

(*) Notice: Subject to any disclaimer, the term of this patent is extended or adjusted under 35 U.S.C. 154(b) by 390 days.

(21) Appl. No.: 14/111,921

(22) PCT Filed: May 19, 2011

(86) PCT No.: PCT/US2011/037189
§ 371 (c)(1),
(2), (4) Date: Oct. 15, 2013

(87) PCT Pub. No.: WO2012/158172
PCT Pub. Date: Nov. 22, 2012

(65) Prior Publication Data
US 2014/0060980 A1    Mar. 6, 2014

(51) Int. Cl.
*B60L 7/00* (2006.01)
*F16D 63/00* (2006.01)
*H02K 49/10* (2006.01)
*H02K 7/106* (2006.01)
*F16D 65/28* (2006.01)

(52) U.S. Cl.
CPC ............ *F16D 63/00* (2013.01); *H02K 7/106* (2013.01); *H02K 49/10* (2013.01); *H02K 2213/09* (2013.01)

(58) Field of Classification Search
CPC ........ F16D 63/00; F16D 63/002; F16D 65/16; F16D 2121/18; F16D 2121/20; F16D 2121/24; H02K 49/10; H02K 2213/09; H02K 7/104; H02K 7/106
See application file for complete search history.

(56) References Cited

U.S. PATENT DOCUMENTS 3,264,504 A * 8/1966 Lamorlette .................. 310/168
4,012,652 A * 3/1977 Gilbert ......................... 310/162
(Continued)

FOREIGN PATENT DOCUMENTS

JP       2000211838      *  8/2000
WO   WO-2010104502 A1 *  9/2010

OTHER PUBLICATIONS

International Search Report and Written Opinion for related International Application No. PCT/US11/37189; report dated Feb. 9, 2012.

*Primary Examiner* — Melody Burch
(74) *Attorney, Agent, or Firm* — Cantor Colburn LLP (57) ABSTRACT

A brake is provided. The brake may include a rotor having a plurality of magnets and a plurality of ferromagnetic poles radially disposed thereabout, and a stator having a plurality of shunts and a plurality of teeth radially disposed thereabout. At least one of the plurality of shunts and the plurality of teeth may be configured to selectively move between an engagement state and a free engagement state. The teeth may be configured to generate magnetic flux with the ferromagnetic poles so as to generate a braking torque during the engagement state. The shunts may be configured to redirect the magnetic flux therethrough and reduce the braking torque between the teeth and the ferromagnetic poles during the free engagement state.

13 Claims, 11 Drawing Sheets

(56) References Cited

U.S. PATENT DOCUMENTS

| | | | |
|---|---|---|---|
| 5,763,977 A * | 6/1998 | Shimasaki | H02K 21/024 310/162 |
| 6,630,764 B1 * | 10/2003 | Dube et al. | 310/177 |
| 2002/0100646 A1 | 8/2002 | Maurice et al. | |
| 2004/0041485 A1 * | 3/2004 | Horber | 310/156.43 |
| 2004/0051414 A1 * | 3/2004 | Stevenson et al. | 310/105 |
| 2005/0211198 A1 * | 9/2005 | Froeschle | F02D 41/20 123/90.11 |
| 2006/0130134 A1 | 6/2006 | Colas | |
| 2006/0169545 A1 * | 8/2006 | Hisamitsu | 187/401 |
| 2010/0252379 A1 * | 10/2010 | Piech et al. | 188/161 |
| 2011/0114421 A1 * | 5/2011 | Piech et al. | 187/276 |

* cited by examiner

BRAKE FOR ELECTRIC MOTOR

CROSS-REFERENCE TO RELATED APPLICATIONS

This application is a U.S. national stage filing under 35 USC §371 of International Patent Application No. PCT/US2011/037189, filed on May 19, 2011.

FIELD OF THE DISCLOSURE

The present disclosure generally relates to a brake for an electric motor, and more particularly, to magnetic braking devices for applying a braking torque upon a shaft of an electric motor.

BACKGROUND OF THE DISCLOSURE

Gearless machines such as elevators or other belt-driven systems typically employ a mechanical or electromechanical braking system to stop or temporarily hold a particular motion. Electromechanical brakes of elevators, for instance, generally employ a clutch-type braking mechanism for supplying a holding or braking torque that is sufficient for slowing or holding an elevator cab at a fixed position. The braking torque supplied by clutch-type brakes is mechanically produced by the friction that is generated between a rotating brake disk that is rigidly attached to a machine shaft and a set of friction pads that are releasably placed in contact with a surface of the brake disk. The engagement or disengagement of the friction pads is electromechanically controlled by a brake coil. Moreover, when the brake coil is activated, a magnetic attraction between the armature plates and an electromagnetic core causes the friction pads to disengage from the surface of the brake disk. When the brake coil is deactivated, springs that engage the armature plates urge the armature plates into engagement with the surface of the brake disk. Although such clutch-type brakes may have been proven to be effective and are still widely used in various gearless applications such as elevators, and the like, there is still room for improvement.

Due to its dependency on friction, clutch-type brakes can be noisy. The braking performance is also dependent on environmental factors, such as temperature, humidity, and the like. For instance, in moist environments, the friction pads of clutch-type brakes may stick to the brake disk. Furthermore, the range of braking torque that a specific clutch-type brake can variably apply is relatively narrow. For example, a clutch-type brake cannot provide enhanced or sufficiently more stopping power for emergency stops, or the like. Conversely, a clutch-type brake cannot provide reduced stopping power for normal stops than with emergency stops. A typical clutch-type brake is limited to its rated torque which is further dictated by the invariable mechanical limits of the brake, material composition of its friction pads, and the like. Accordingly, it follows that clutch-type brakes offer less overall control or variation of the braking torque.

The manufacturing and installation of clutch-type brakes onto the frame and shaft of an elevator can be complex and costly. Correspondingly, making adjustments to a pre-existing clutch-type braking system may also be costly and difficult to perform. Regardless of the degree of maintenance performed, however, long-term use of clutch-type brakes could result in burnished surfaces on bearing frames, splinted shaft ends, and the like. Furthermore, the very nature of clutch-type brakes calls for a substantial number of moving parts and components, which indicates yet another area having room for improvements. For instance, clutch-type brakes as applied to elevators may require several mechanical springs, O-rings, guiding pins, and the like.

Clutch-type brakes may also use proximity sensors, micro-switches, or the like, to indicate the status of the brake or to provide feedback of the performance of the brake. Furthermore, the pure mechanical nature of clutch-type brakes makes it difficult to integrate the brake with any other useful controls or functions, such as speed detection, position detection, rescue encoding, or any other subsystem functions.

SUMMARY OF THE DISCLOSURE

In accordance with one aspect of the disclosure, a brake is provided. The brake may include a rotor having a plurality of magnets and a plurality of ferromagnetic poles radially disposed thereabout, and a stator having a plurality of shunts and a plurality of teeth radially disposed thereabout. At least one of the plurality of shunts and the plurality of teeth may be configured to selectively move between an engagement state and a free engagement state. The teeth may be configured to generate magnetic flux with the ferromagnetic poles so as to generate a braking torque during the engagement state. The shunts may be configured to redirect the magnetic flux therethrough and reduce the braking torque between the teeth and the ferromagnetic poles during the free engagement state.

In a refinement, the brake may further include an actuator assembly configured to selectively engage the shunts and the teeth between the engagement state and the free engagement state.

In another refinement, the shunts and the teeth may be configured to axially move with respect to one another while transitioning between the engagement state and the free engagement state.

In another refinement, the shunts and the teeth may be configured to radially move with respect to one another while transitioning between the engagement state and the free engagement state.

In another refinement, the shunts and the teeth may be configured to rotatably move with respect to one another while transitioning between the engagement state and the free engagement state.

In another refinement, the rotor may further include an electrically conductive inner layer configured to promote the flow of eddy currents therethrough.

In another refinement, the magnets of the rotor may be configured such that adjacent magnets are in polar opposition with respect to one another.

In yet another refinement, the brake is in combination with an electric motor.

In a related refinement, the brake and the electric motor comprise a machine for an elevator system.

In accordance with another aspect of the disclosure, a brake is provided. The brake may include a stator having a plurality of teeth radially disposed thereabout, a rotor rotatably disposed about the stator and an actuator assembly disposed within the stator. The rotor may include a plurality of magnets and a plurality of ferromagnetic poles radially disposed thereabout. The actuator assembly may be configured to selectively engage the teeth between an engagement state and a free engagement state. The actuator assembly may also be configured to promote variable magnetic flux between the teeth and the ferromagnetic poles so as to cause a braking torque during the engagement state. The actuator assembly may further be configured to reduce variable magnetic flux between the teeth and the ferromagnetic poles so as to reduce the braking torque during the free engagement state.

In a refinement, the teeth may be radially movable between the engagement state and the free engagement state.

In another refinement, the teeth may be axially movable between the engagement state and the free engagement state.

In another refinement, the rotor may further include an electrically conductive inner layer configured to promote the flow of eddy currents therethrough.

In another refinement, the magnets of the rotor may be configured such that adjacent magnets are in polar opposition with respect to one another.

In another refinement, the actuator assembly may be configured to bias the teeth into one of the engagement state and the free engagement state.

In yet another refinement, the brake is in combination with an electric motor.

In a related refinement, the brake and the electric motor comprise a machine for an elevator system.

In accordance with yet another aspect of the disclosure, a brake for applying a braking torque upon a machine shaft is provided. The brake may include a stator having a plurality of shunts and a plurality of teeth radially disposed thereabout, a rotor with an electrically conductive inner layer having a plurality of magnets and a plurality of ferromagnetic poles radially disposed thereabout and an actuator assembly disposed within the stator. The shunts may be movable with respect to the teeth. The rotor may be rigidly coupled to the machine shaft and rotatably disposed about the stator such that the magnets and the ferromagnetic poles are in close proximity to the teeth. The actuator assembly may be configured to selectively move the shunts relative to the teeth into one of an engagement state and a free engagement state. The shunts may enable variable magnetic flux between the teeth and the ferromagnetic poles during the engagement state. The shunts may further substantially reduce magnetic flux between the teeth and the ferromagnetic poles during the free engagement state.

In a refinement, the actuator assembly may include a plunger configured to mechanically engage the movable plates between the engagement and free engagement states.

In another refinement, the actuator assembly may include one or more magnetic rings configured to magnetically engage the movable plates between the engagement and free engagement states.

In yet another refinement, the brake is in combination with an electric motor.

In a related refinement, the brake and the electric motor comprise a machine for an elevator system.

These and other aspects of this disclosure will become more readily apparent upon reading the following detailed description when taken in conjunction with the accompanying drawings.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Figure 1:
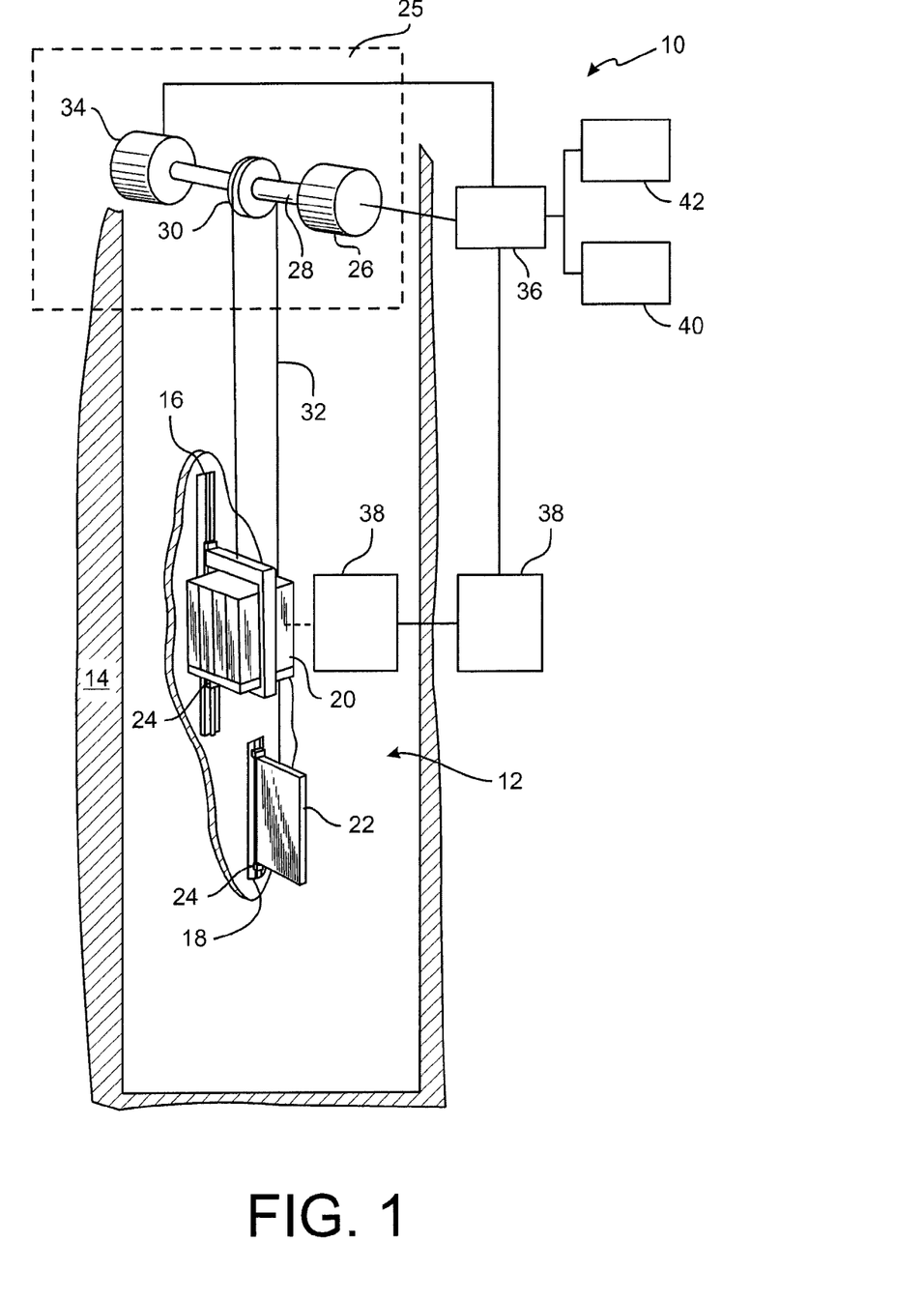
FIG. 1 is a partial perspective view of an elevator system constructed in accordance with the teachings of the disclosure.

Referring now to FIG. 1, a schematic diagram of an exemplary elevator system 10 is provided. It is to be understood that the version of the elevator system 10 shown in FIG. 1 is for illustrative purposes only and to present background for some of the various components of a general elevator system. Other components of an elevator system unnecessary for an understanding of the present disclosure are not described.

As shown in FIG. 1, the elevator system 10 may reside fully or partially in a hoistway 12 that is vertically disposed within a building 14. The hoistway 12 may generally be a hollow shaft provided within a central portion of the building 14 with multiple hoistways being provided if the building is of sufficient size and includes multiple elevators. Extending substantially the length of the hoistway 12 may be rails 16, 18 along which an elevator cab 20 as well as counterweights 22 may be slidably mounted. While not depicted in detail in FIG. 1, one of ordinary skill in the art will understand that both the cab 20 and the counterweight 22 may further include roller mounts 24, bearings, or the like, that are slidably mounted to the rails 16, 18 in a secure fashion so as to provide for a smooth motion along the rails 16, 18.

The elevator cab 20 may be caused to vertically move within the hoistway 12 by a machine 25 of the elevator system 10, for example, a gearless machine having an electric motor 26. Moreover, the motor 26 may generate a rotational torque that is communicated along a drive shaft 28 toward an associated traction sheave 30. Upon rotation of the traction sheave 30, one or more tension members 32 provided about the traction sheave 30 may serve to pull up or let down the elevator cab 20 through the hoistway 12 to the desired height. The motor 26 (through, for example, traction sheave 30 and/or drive shaft 28) may further be coupled to a braking system 34 configured to selectively supply a braking torque upon the traction sheave 30 and/or shaft 28, and thus, slow, halt and/or prevent vertical movement of the elevator cab 20, for example, once the desired height is reached, during an emergency stop, or the like. The elevator system 10 may further provide a controller 36 configured to electrically communicate with each of the motor 26 and the braking system 34 so as to control movement of the elevator cab 20. In particular, the controller 36 may be in electrical communication with a series of operator interfaces 38 configured to receive instructions for the desired movement. For example, the controller 36 may communicate with a plurality of operator interfaces 38 that are provided on each floor to call the elevator cab 20, as well as operator interfaces 38 that are provided on each cab 20 which enable passengers to direct the cab 20 to a particular floor. The controller 36 may further communicate with a safety chain circuit 40 as well as a power supply 42 associated with the elevator system 10.

Figure 2:
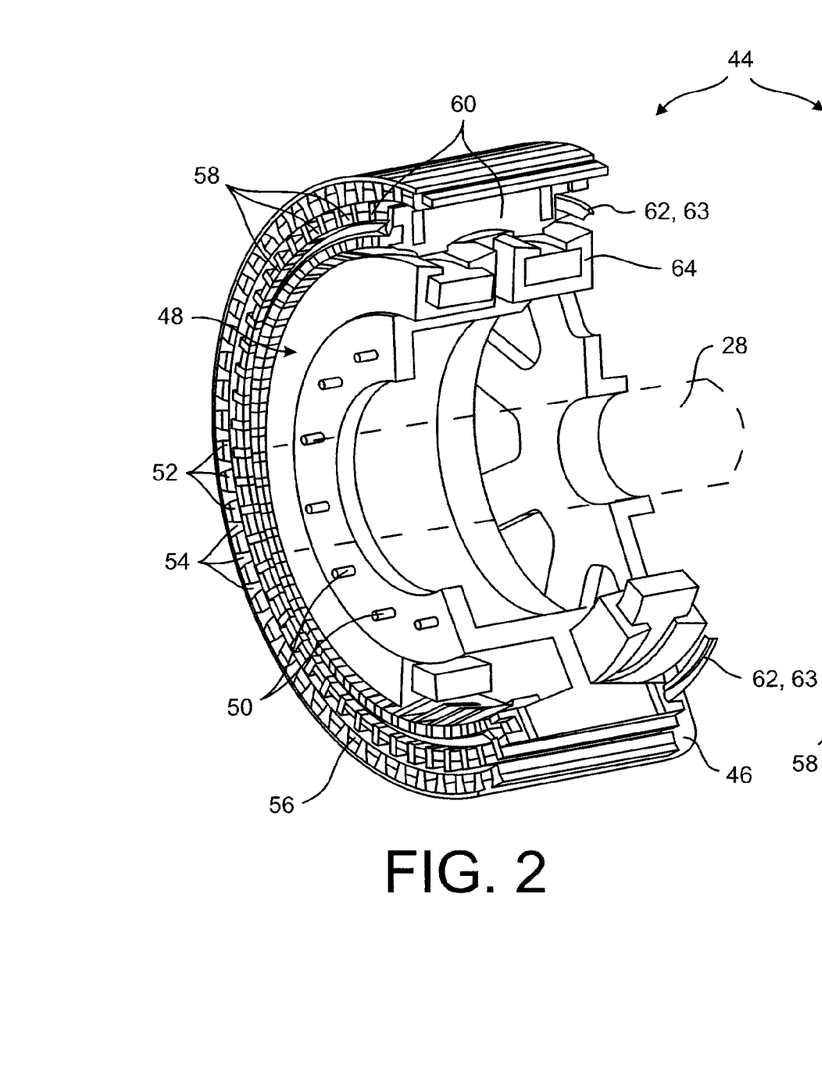
FIGS. 2-3 are partial perspective views of one exemplary brake constructed in accordance with the teachings of the disclosure.
Figure 3:
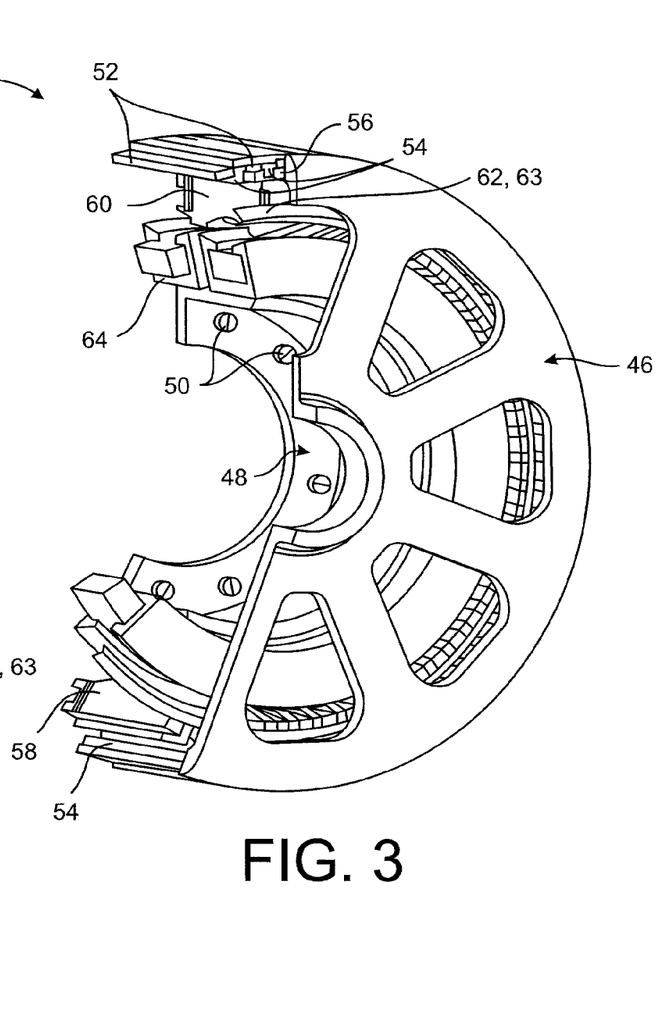
Figures 4, 5, 6:
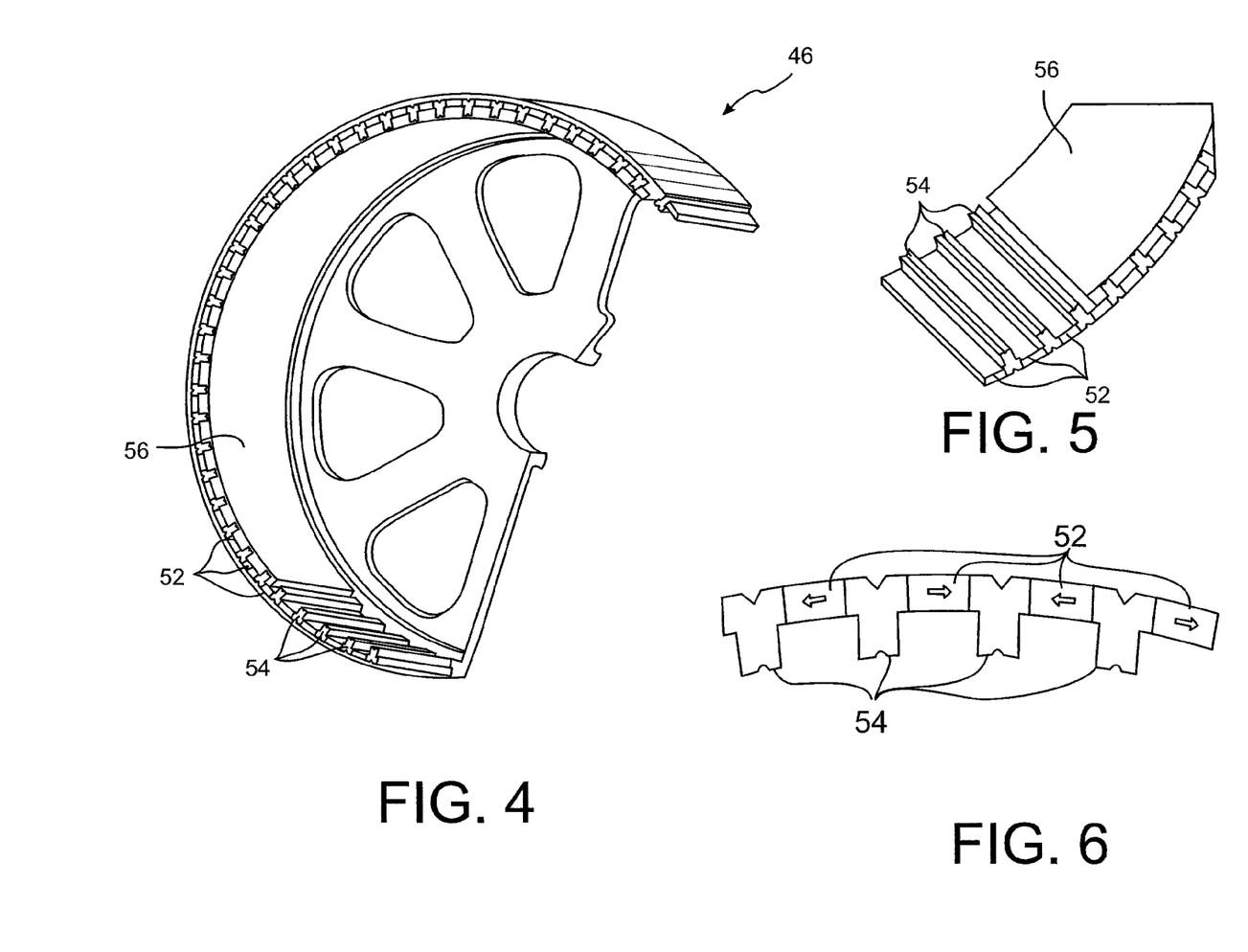
FIGS. 4-6 are partial perspective views of a rotor.

Turning to FIGS. 2 and 3, one exemplary brake 44 that may be part of the braking system 34 of FIG. 1 is provided. As shown, the brake 44 may generally include a rotor 46 and a stator 48. The rotor 46 may be rigidly coupled to a drive shaft 28 (or the rotor 46 could be an extension of the drive shaft 28) and rotatably coupled about the stator 48. The stator 48 may be rigidly coupled to a housing of the braking system 34, elevator system 10, motor 26, or the like, using one or more fasteners 50. As further illustrated in FIGS. 4-6, the rotor 46 may include a plurality of permanent magnets 52 radially disposed thereabout. More specifically, the magnets 52 may be evenly sized and spaced such that each magnet 52 is in magnetic polar opposition with an adjacent magnet 52. The spaces between the magnets 52 may be filled with a plurality of ferromagnetic inserts or poles 54. The rotor 46 may further provide an electrically conductive inner layer 56 configured to promote the flow of eddy currents therethrough.

Figure 7:
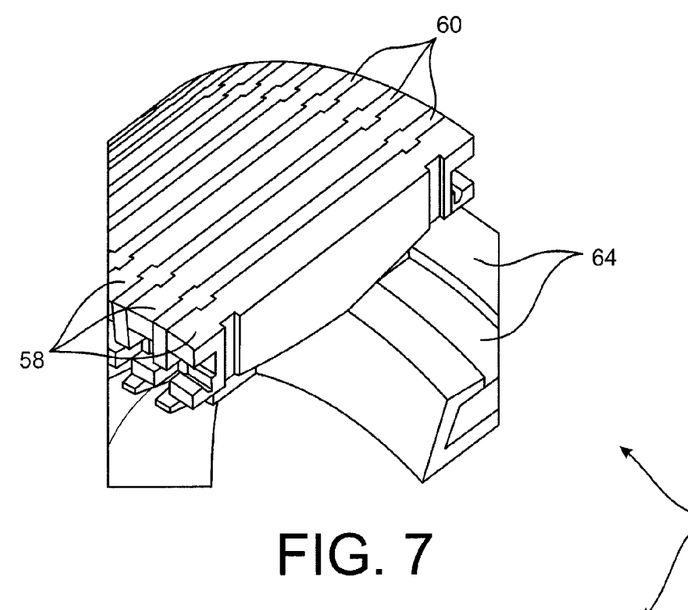
FIGS. 7-8 are partial perspective views of a stator.
Figure 8:
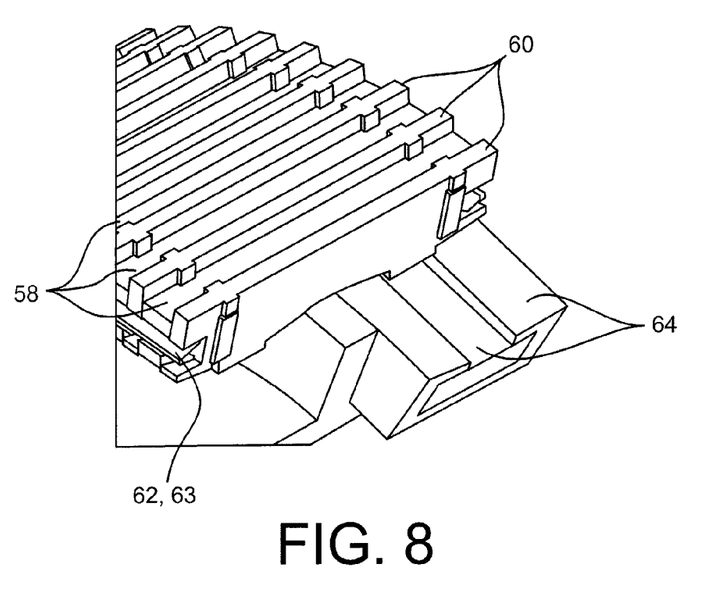

Referring to FIGS. 7 and 8, the stator 48 may include a plurality of magnetic shunts 58 and a plurality of teeth 60 radially and alternatingly disposed thereabout. The teeth 60 of the stator 48 may be evenly sized and spaced according to the configuration of the ferromagnetic poles 54 such that, when radially aligned with the rotor 46, each tooth 60 is positioned in direct proximity with a corresponding pole 54 of the rotor 46. Furthermore, the shunts 58 and the teeth 60 of the stator 48 may be selectively configurable between an engagement state and a free engagement state. For example, the teeth 60 may be radially movable between the retracted position of FIG. 7 and the extended position of FIG. 8 while the shunts 58 remain stationary. In alternative embodiments, the shunts 58 may be radially movable between a retracted position and an extended position while the teeth 60 remain stationary. In still further alternatives, both sets of shunts 58 and teeth 60 may be movable while transitioning between the engagement and free engagement states. The stator 48 may further include an arrangement of O-ring springs 62, limiters 63, and the like, generally configured to limit the movement of the shunts 58 and/or teeth 60 within the stator 48 and/or to bias any one of the shunts 58 and teeth 60 into radially retracted or extended positions.

Actuation between the engagement and free engagement states may be provided by one or more actuator assemblies or actuators 64. The actuators 64 may include wire coils, windings, or the like, for carrying an electric current, and further, may employ electromagnetic and/or mechanical means to transition the shunts 58 and/or teeth 60 of the stator 48 between the engagement and free engagement states. More specifically, electric current supplied by the power supply 42 and selectively enabled by the controller 36 may be used to energize the coils of the actuator assemblies 64 and invoke a magnetic and/or mechanical reaction from the movable shunts 58 and/or teeth 60. In the embodiment of FIGS. 7 and 8, for example, the stator 48 may employ actuators 64 to electromagnetically attract the movable teeth 60 to selectively shift the teeth 50 between engagement and free engagement states. The repelling force biasing the teeth 60 in the outwardly direction may be provided by O-ring springs 62, or the like. Moreover, the actuators 64 may be configured such that, by default, the movable teeth 60 are biased into the extended position of FIG. 8, for example, extended outwardly by O-ring springs 62, and retracted into the position of FIG. 7 only when the coils within the actuators 64 are energized. In alternative embodiments, the actuators 64 may be configured such that the movable teeth 60 are biased in the retracted position of FIG. 7 and extended into the position of FIG. 8 only when the coils within actuators 64 are energized.

Figure 9:
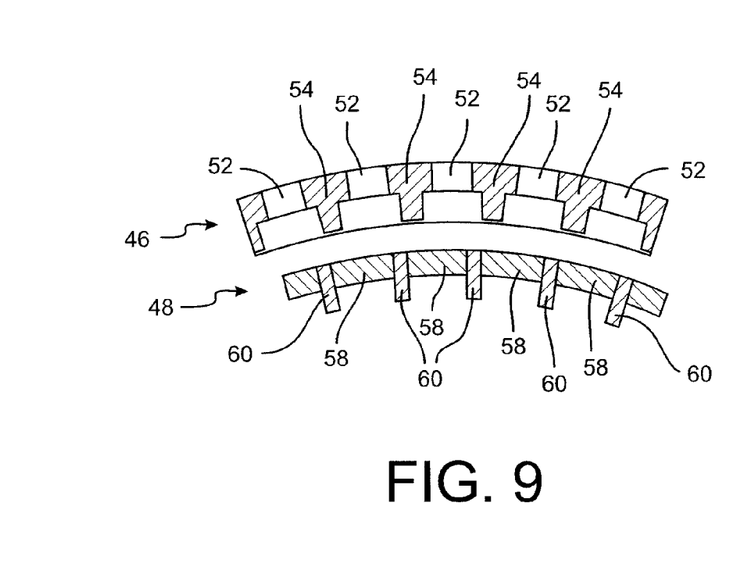
FIGS. 9-10 are partial cross-sectional and diagrammatic views of interactions between a stator and a rotor of one exemplary brake.
Figure 10:
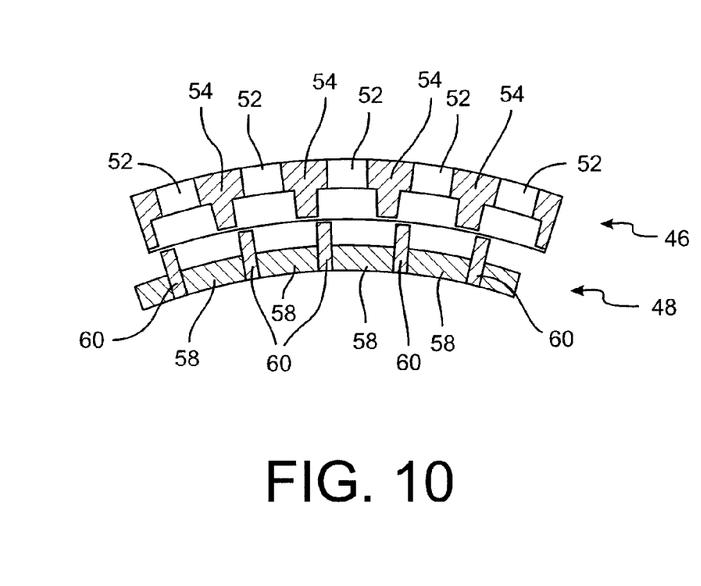

As shown in FIGS. 9 and 10, the brake 44 may be configured such that the teeth 60 of the stator 48 are movable while the shunts 58 remain stationary. During a free engagement state, as illustrated in FIG. 9, the teeth 60 may be radially retracted to as to be farther away from the poles 54 of the rotor 46 and flush with the exterior surfaces of the shunts 58. As a result, variations in the magnetic flux as well as the rotational resistance between the rotor 46 and the stator 48 may be substantially reduced. During an engagement state, as illustrated in FIG. 10, the teeth 60 may be radially extended so as to be in closer proximity with the poles 54 of the rotor 46 and protruding beyond the exterior surfaces of the shunts 58. Correspondingly, the varying magnetic flux between the poles 54 and the teeth 60 may generate a braking torque or a rotational resistance between the rotor 46 and the stator 48 so as to cause an associated elevator cab 20 to slow to a halt.

Figure 11:
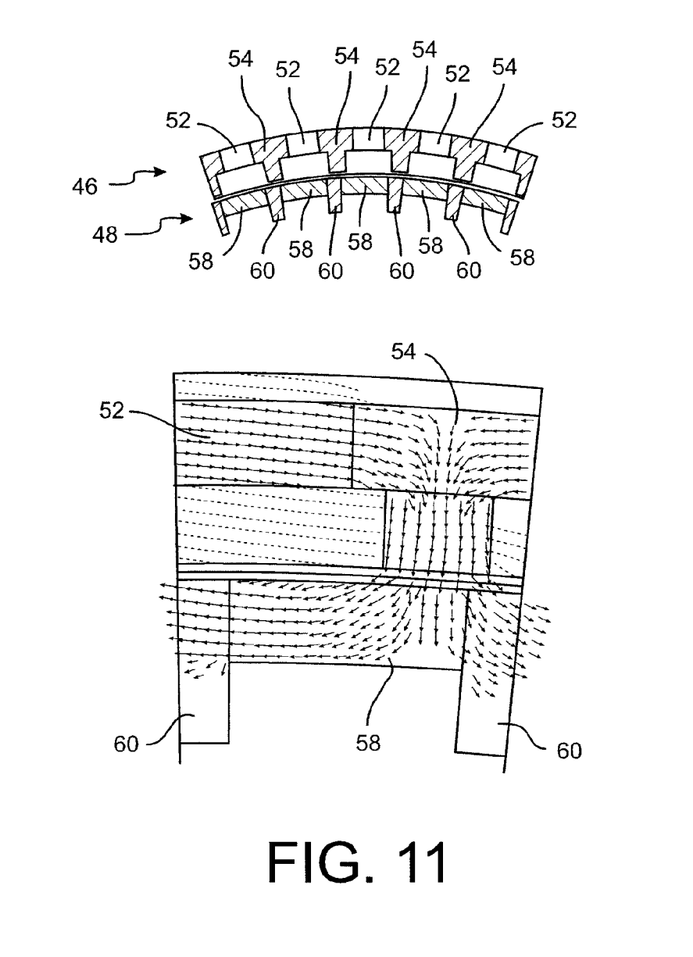
FIGS. 11-12 are partial cross-sectional views of interactions between a stator and a rotor of another exemplary brake.
Figure 12:
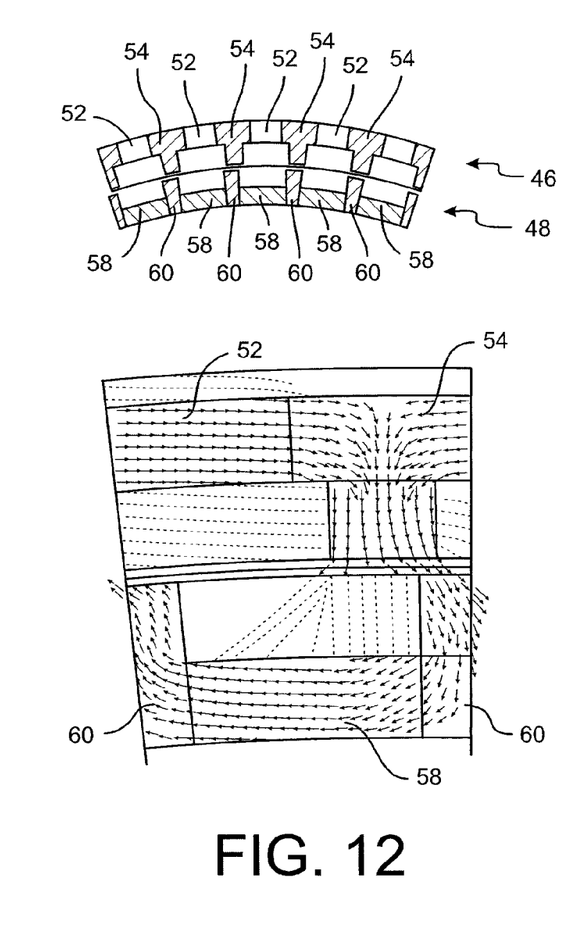

In still further alternatives, as shown in FIGS. 11 and 12, the shunts 58 may be movable while the teeth 60 remain stationary. During a free engagement state of operation, for example, when the movable shunts 58 of the stator 48 of FIG. 11 are in the radially extended position, the magnetic flux through the shunts 58 and the teeth 60 of the stator 48 may be relatively consistent as seen by the rotating rotor 46. Accordingly, when braking or holding is not required, the rotor 46 may be subjected to reduced rotational resistance and essentially free to rotate about the stator 48. When braking or holding is required, an engagement state of operation may be induced. During an engagement state, for example, the shunts 58 of the stator 48 of FIG. 12 may be shifted in the radially retracted position such that the magnetic flux through the shunts 58 and the teeth 60 of the stator 48 is varied as the rotor 46 rotates about the stator 48. The variable magnetic flux may in turn generate eddy currents in the inner layer 56 of the rotor 46, and further, generate rotational resistance and a braking torque between the poles 54 of the rotor 46 and the teeth of the stator 48. By slowing or holding the rotor 46, the brake 44 may effectively slow or hold movements in each of the drive shaft 28, traction sheave 30 and the associated elevator cab 20.

Figure 13:
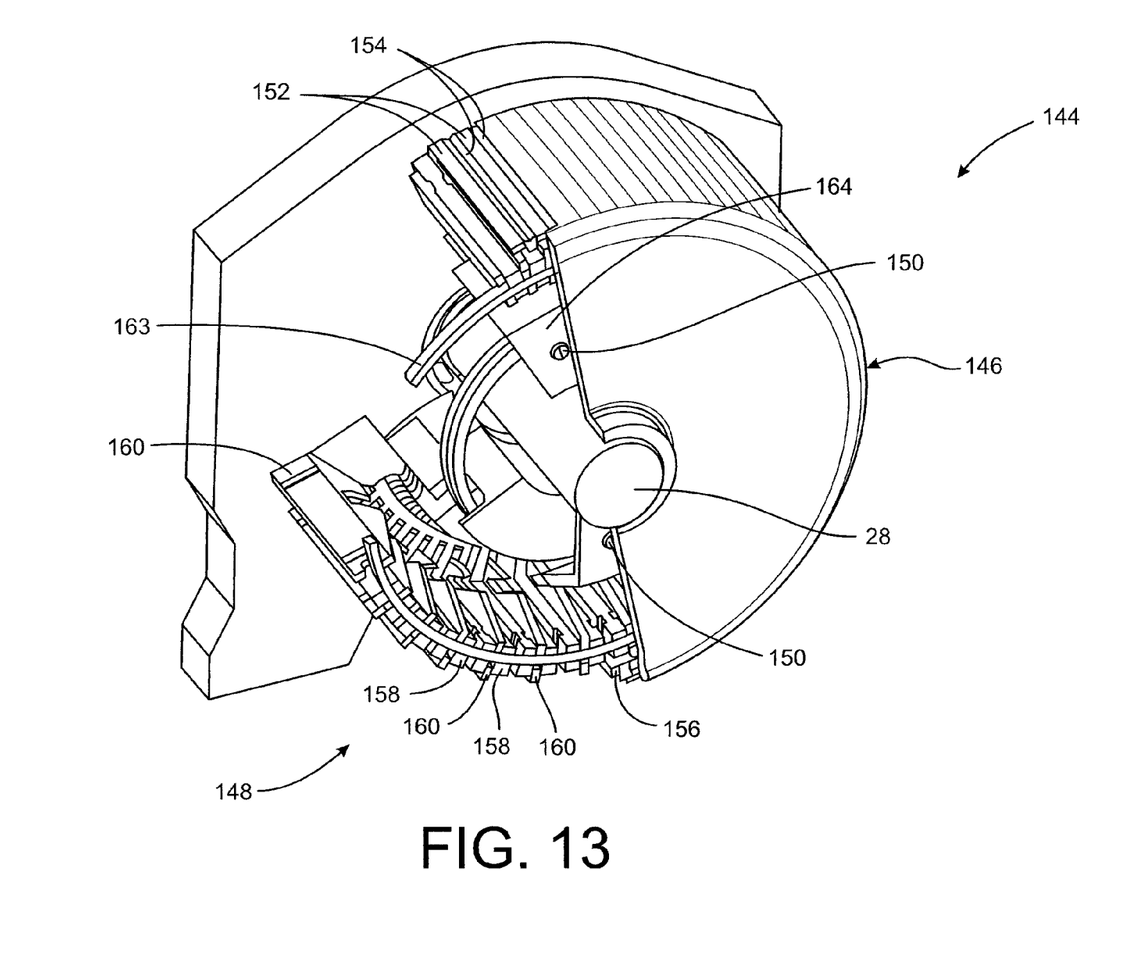
FIGS. 13-15 are partial perspective views of another exemplary brake.
Figure 14:
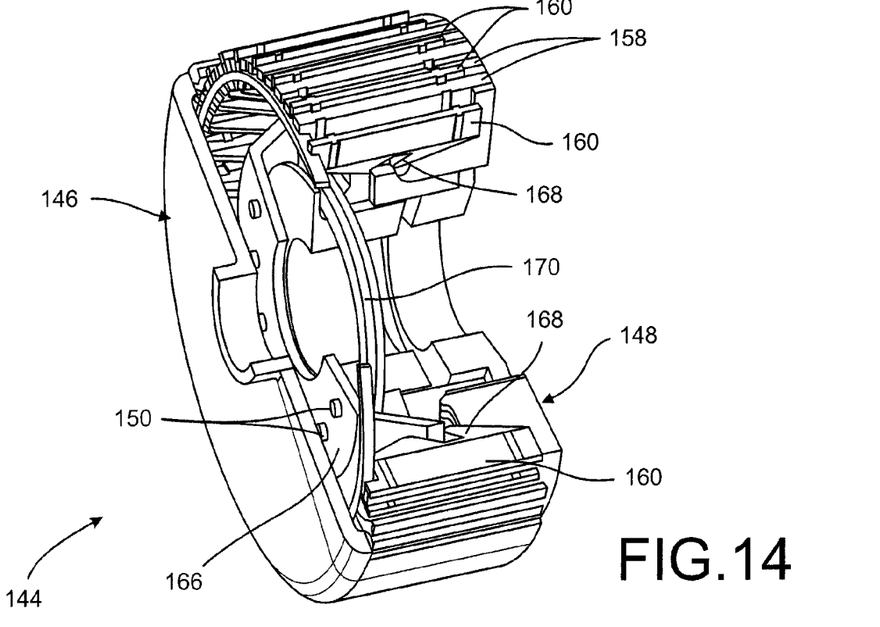
Figure 15:
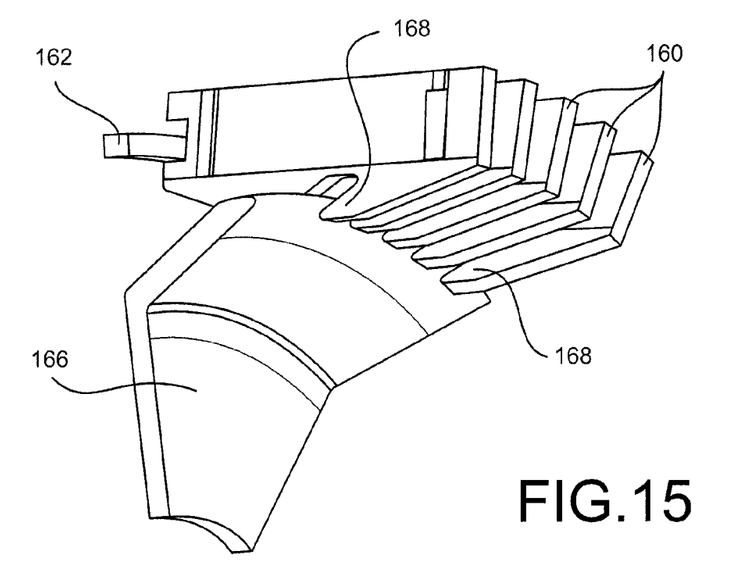

Turning now to FIGS. 13-15, another exemplary embodiment of a brake 144 that may be used in conjunction with the braking system 34 of FIG. 1 is provided. As with previous embodiments, the brake 144 may generally include a rotor 146 and a stator 148. The rotor 146 may be rigidly coupled to the drive shaft 28 of the elevator motor 26 and rotatably coupled about the stator 148. The stator 148 may be rigidly coupled to a housing of the braking system 34, elevator system 10, or the like, using one or more fasteners 150. The rotor 146 may include a plurality of magnets 152 radially disposed thereabout. More particularly, the magnets 152 may be evenly distributed about the rotor 146 such that each magnet 152 is in magnetic or polar opposition with an adjacent magnet 152. The spaces between the magnets 152 may be filled with a plurality of ferromagnetic inserts or poles 154. The rotor 146 may further provide an electrically conductive inner layer 156 configured to promote the flow of eddy currents therethrough.

Still referring to FIGS. 13-15, the stator 148 may include a plurality of magnetic shunts 158 and a plurality of teeth 160 radially and alternatingly disposed thereabout. The teeth 160 of the stator 148 may be evenly sized and spaced according to the configuration of the ferromagnetic poles 154 such that, when radially aligned with the rotor 146, each tooth 160 is positioned in direct proximity with a corresponding pole 154 of the rotor 146. As in previous embodiments, the shunts 158 and the teeth 160 of the stator 148 may be selectively configurable between an engagement state and a free engagement state. For example, the teeth 160 of the stator 148 of FIGS. 13-15 may be radially movable between a retracted position and an extended position while the shunts 158 remain stationary. In alternative embodiments, the shunts 158 may be radially movable between a retracted position and an extended position while the teeth 160 remain stationary. In still further alternatives, both sets of shunts 158 and teeth 160 may be movable while transitioning between the engagement and free engagement states. The stator 148 may further include O-ring limiters 163, or the like, generally configured to limit the range of radial movement of the movable teeth 60. Moreover, the limiters 163 may serve to prevent the teeth 60 from extending into contact with the rotor 146 and/or to prevent the teeth 60 from retracting into contact with an actuator assembly 164 disposed within the stator 148.

The brake 144 of FIGS. 13-15 may selectively move the teeth 160 of the stator 148 between an engagement state and a free engagement state using the actuator assembly 164. In particular, the actuator 164 may include coils or windings for receiving an electric current that is selectively supplied by the controller 36 and the power supply 42 of the associated elevator system 10. In response to the electric current, the actuator 164 may generate an electromagnetic field which may further cause axial movement of a mechanical plunger 166 disposed within the stator 148. The plunger 166 may be configured to mechanically interface with a hook 168 disposed on an inner edge of each tooth 160 such that the plurality of teeth 160 radially extends or retracts based on the axial position of the plunger 166. Additionally, the actuator 164 may include one or more washer springs 170, or the like, configured to axially bias the plunger 166 into one of the engagement and free engagement states of operation.

In the particular embodiment of FIGS. 13-15, for example, the brake 144 may be configured such that the actuator 164 must be energized in order for the brake 144 to be disengaged or be placed in a free engagement state of operation. Correspondingly, when the actuator 164 is not energized, the brake 144 may configured to be in an engagement state and generate a braking torque. More specifically, the washer springs 170 of FIG. 14 may be configured to axially bias the mechanical plunger 166 toward the rotor 146, and thus, bias the plurality of teeth 160 to be in a radially retracted position when there is no electric current flowing through the coils of the actuator 164. As in previous embodiments, the change in magnetic flux and the rotational resistance between the rotor 146 and the stator 148 may be substantially reduced during such a free engagement state of operation, and thus, the rotor 146 may be free to rotate about the stator 148. Conversely, when the actuator 164 is energized and electric current is supplied to the coils thereof, the actuator 164 may generate a magnetic attraction with the plunger 166 which further serves to radially extend the associated teeth 160. Specifically, the magnetic attraction generated by the actuator 164 may be such that the opposing mechanical bias formed by the washer springs 170 is overcome and the plunger 166 is axially pulled away from the rotor 146. As the plunger 166 is axially pulled away from the rotor 146, the outermost edge of the plunger 166 may push against the hooks 168 of the teeth 160 to extend the plurality of teeth 160 outwardly and beyond the shunts of the stator 148. As in previous embodiments, radially extending the teeth 160 beyond the shunts 158 of the stator 148 may generate a varying magnetic flux between the rotor 146 and the stator 148, and thus, apply rotational resistance or a braking torque on the rotor 146.

Figure 16:
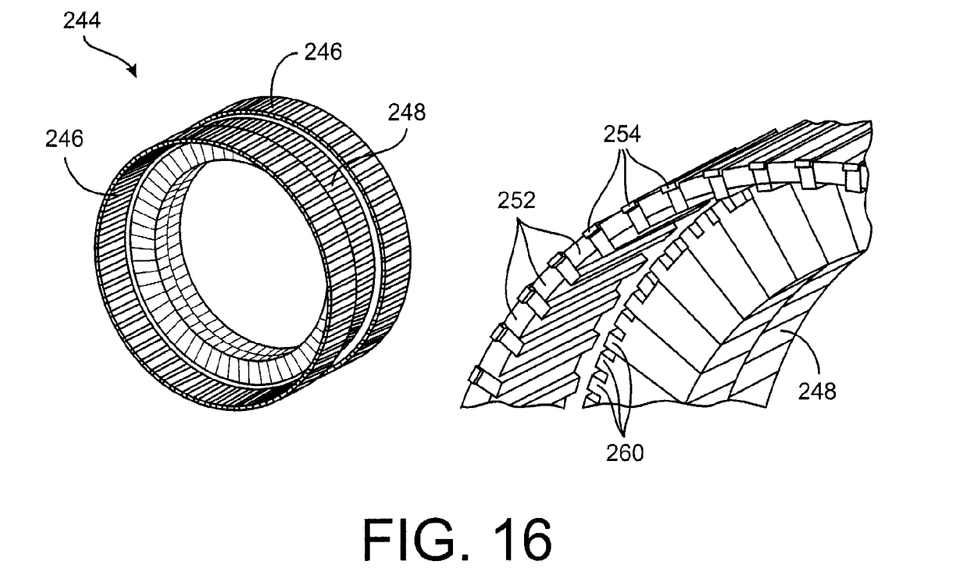
FIGS. 16-17 are perspective views of yet another exemplary brake.
Figure 17:
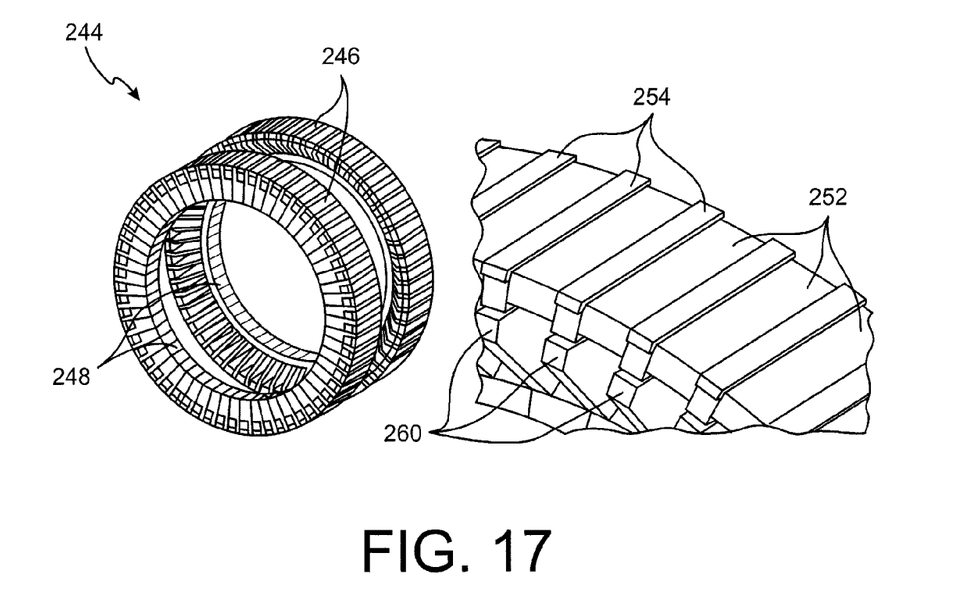

Turning to FIGS. 16 and 17, another exemplary brake 244 that may be used in conjunction with the braking system 34 of FIG. 1 is provided. As in previous embodiments, the brake 244 may generally include a rotor 246 and a stator 248. The rotor 246 may include a plurality of magnets 252 and a plurality of ferromagnetic poles 254 alternatingly disposed thereabout. The stator 248 may include at least a plurality of teeth 260 radially disposed thereabout. Furthermore, the stator 248 may be sized to be concentrically positioned within the rotor 246 and such that the exterior surface of the stator 248 is substantially in close proximity to the interior surface of the rotor 246. The sizing and spacing of the teeth 260 of the stator 248 may be configured such that, when aligned with the rotor 246, each tooth 260 is in direct proximity with a corresponding pole 254 of the rotor 246.

As shown in FIGS. 16 and 17, for example, the brake 244 may include two or more axially separated rotors 246 as well as two or more axially separable stators 248 corresponding to the rotors 246. More specifically, the axial position of each stator 248 may selectively be adjusted to concentrically fit within a respective rotor 246 based on the desired operation. For instance, during a free engagement state of operation, each stator 248 may be axially moved out of axial alignment with its corresponding rotor 246, as shown in FIG. 16. As there is no magnetic interaction between the poles 254 of the rotor 246 and the teeth 260 of the stator 248, the rotor 246 may be free to rotate. During an engagement state of operation, or when braking or holding is required, each stator 248 may be concentrically positioned to be in axial alignment with its corresponding rotor 246, as shown in FIG. 17. As there is magnetic interaction, or variable magnetic flux, between the poles 254 of the rotor 246 and the teeth 260 of the stator 248, the rotor 246 may be subjected to rotational resistance or a braking torque. Accordingly, the brake 244 of FIGS. 16 and 17 may employ a configuration of one or more actuator assemblies (not shown) which, when energized, may force the stator 248 to axially combine as shown in FIG. 16, or alternatively, force the stator 248 to axially separate as shown in FIG. 17.

Figure 18:
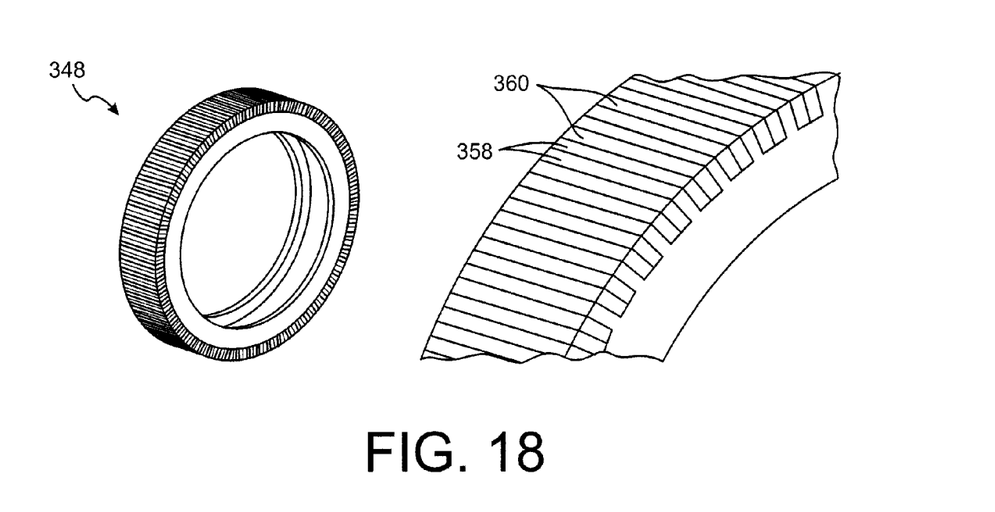
FIGS. 18-19 are perspective views of the stator of another exemplary brake.
Figure 19:
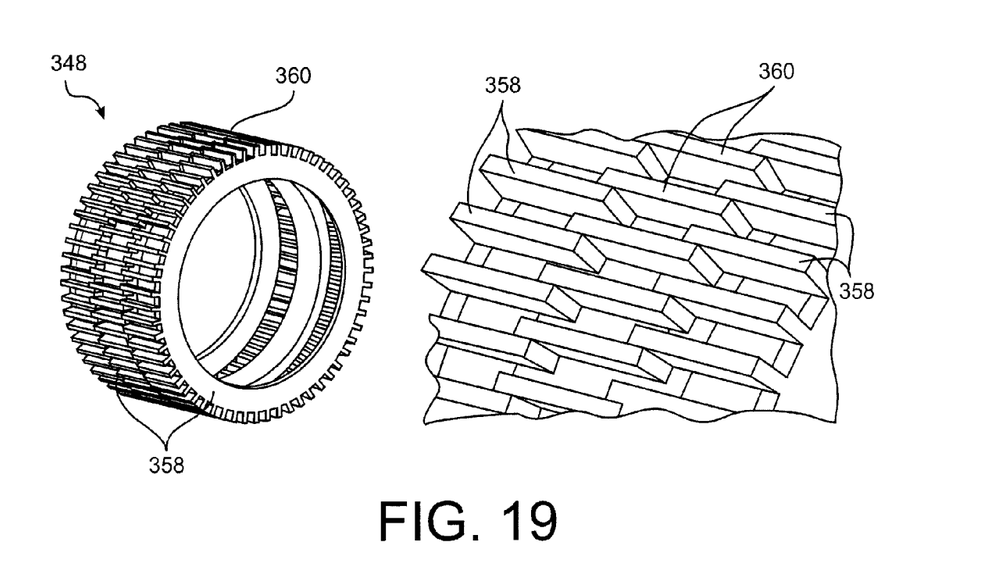

With reference to FIGS. 18 and 19, another exemplary stator 348 that may be used in conjunction with the braking system 34 of FIG. 1 is provided. As shown, the stator 348 may include one stationary set of teeth 360 and two or more axially movable sets of shunts 358. More specifically, the two sets of shunts 358 may be configured such that axially combining the two sets of shunts 358 as shown in FIG. 18 fills the gaps between the plurality of teeth 360 during a free engagement state of operation, or when braking or holding is not required. As the shunts 358 serve to reduce variations in the magnetic flux, a rotor (not shown) rotatably disposed about the stator 348 and having ferromagnetic poles radially disposed thereabout may be relatively free of rotational resistance. During an engagement state of operation, or when braking or holding is desired, the two sets of shunts 358 may be axially distanced from the set of teeth 360 as shown in FIG. 19. Such axial separation may serve to expose the teeth 360 and substantially increase the variation in magnetic flux between the teeth 360 and the poles of the associated rotor. The varying magnetic flux may in turn increase rotational resistance, and thus, apply a braking torque upon the rotor. Correspondingly, the stator 348 of FIGS. 18 and 19 may employ a configuration of one or more actuator assemblies (not shown) which, when energized, may force the two sets of shunts 358 to axially combine as shown in FIG. 18, or alternatively, force the two sets of shunts 358 to axially separate as shown in FIG. 19.

Figure 20:
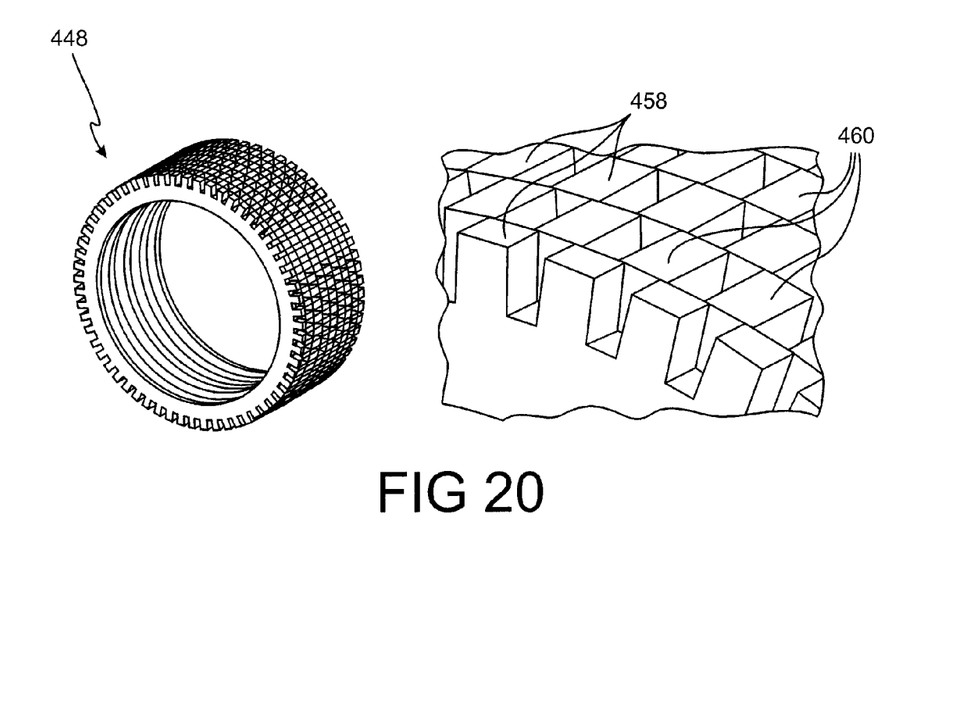
FIGS. 20-21 are perspective views of the stator of yet another exemplary brake.
Figure 21:
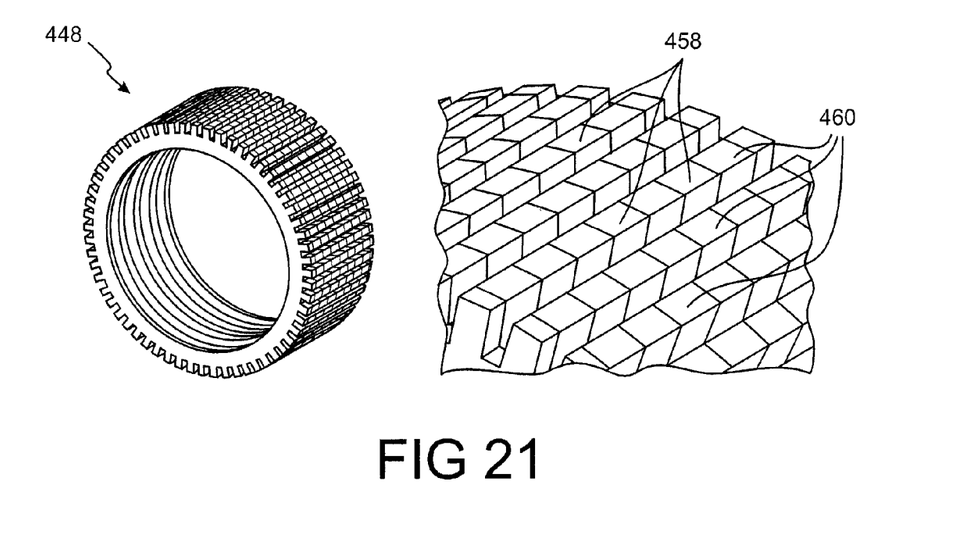

In FIGS. 20 and 21, yet another exemplary stator 448 that may be used in conjunction with the braking system 34 of FIG. 1 is provided. Specifically, the stator 448 may include one or more sets of stationary teeth 460 alternatingly disposed between one or more sets of movable shunts 458. As shown in FIG. 20, for example, the shunts 458 may be configured to be rotatably adjustable relative to the teeth 460 such that a predefined degree of rotation effectively positions each shunt 458 within the gap formed between two radially adjacent teeth 460 during a free engagement state of operation, or when braking or holding is not required. Because the shunts 458 serve to reduce variations in the magnetic flux, a rotor (not shown) rotatably disposed about the stator 448 and having ferromagnetic poles radially disposed thereabout may be relatively free of rotational resistance. During an engagement state of operation, or when braking or holding is desired, the sets of shunts 458 may be rotatably adjusted again relative to the sets of teeth 460 such that the gaps between radially adjacent teeth 460 are unobstructed as shown FIG. 21. Exposing the teeth 460 may increase the variation in magnetic flux between the teeth 460 and the poles of the rotor rotating thereabout. Such varying magnetic flux may increase rotational resistance, and thus, apply a braking torque upon the rotor. The stator 448 of FIGS. 20 and 21 may employ a configuration of one or more actuator assemblies (not shown) which, when energized, may rotate and radially position the shunts 458 between the teeth 460 as shown in FIG. 20, or alternatively, rotate and radially position the shunts 458 in line with the teeth 460 as shown in FIG. 21.

INDUSTRIAL APPLICABILITY

The brakes disclosed herein may be used with machines in a wide range of industrial or commercial applications, such as with gearless machines in elevator systems. The selectively enabled magnetic interaction between the rotors and stators of the brakes may provide improved control of braking or holding without the adverse effects associated with clutch-type brakes that may be dependent on friction. Moreover, the brakes disclosed may further provide increased reliability, consistency and comfort.

While only certain embodiments have been set forth, alternatives and modifications will be apparent from the above description to those skilled in the art. These and other alternatives are considered equivalents and within the spirit and scope of this disclosure.

What is claimed is:

1. A brake, comprising:
    a rotor having a plurality of magnets and a plurality of ferromagnetic poles radially disposed thereabout; and
    a stator having a plurality of shunts and a plurality of teeth radially disposed thereabout, at least one of the plurality of shunts and the plurality of teeth being configured to selectively move between an engagement state and a free engagement state, the teeth being configured to generate magnetic flux with the ferromagnetic poles so as to generate a braking torque during the engagement state, the shunts being configured to redirect the magnetic flux therethrough and reduce the braking torque between the teeth and the ferromagnetic poles during the free engagement state; and
    an actuator assembly configured to selectively extend the one of the plurality of shunts and teeth relative to the other to achieve the engagement state, and to retract the one of the plurality of shunts and teeth relative to the other to achieve the free engagement state.

2. The brake of claim 1, wherein the shunts and the teeth are configured to axially move with respect to one another while transitioning between the engagement state and the free engagement state.

3. The brake of claim 1, wherein the shunts and the teeth are configured to radially move with respect to one another while transitioning between the engagement state and the free engagement state.

4. The brake of claim 1, wherein the shunts and the teeth are configured to rotatably move with respect to one another while transitioning between the engagement state and the free engagement state.

5. The brake of claim 1, wherein the rotor further comprises an electrically conductive inner layer configured to promote the flow of eddy currents therethrough.

6. The brake of claim 1, wherein the magnets of the rotor are configured such that adjacent magnets are in polar opposition with respect to one another.

7. The brake of claim 1, in combination with an electric motor.

8. The brake and electric motor of claim 7, wherein the brake and electric motor comprise a machine for an elevator system.

9. A brake for applying a braking torque upon a machine shaft, comprising:
    a stator having a plurality of shunts and a plurality of teeth radially disposed thereabout, the shunts being movable between an extended position and a retracted position with respect to the teeth;
    a rotor with an electrically conductive inner layer having a plurality of magnets and a plurality of ferromagnetic poles radially disposed thereabout, the rotor being rigidly coupled to the machine shaft and rotatably disposed about the stator such that the magnets and the ferromagnetic poles are in close proximity to the teeth; and
    an actuator assembly disposed within the stator, the actuator assembly being configured to selectively extend the shunts relative to the teeth to achieve an engagement state and to retract the shunts relative to the teeth to achieve a free engagement state, the shunts enabling variable magnetic flux between the teeth and the ferromagnetic poles during the engagement state, the shunts substantially reducing magnetic flux between the teeth and the ferromagnetic poles during the free engagement state.

10. The brake of claim 9, wherein the actuator assembly comprises a plunger configured to mechanically engage the teeth between the engagement and free engagement states.

11. The brake of claim 9, wherein the actuator assembly is configured to magnetically engage the teeth between the engagement and free engagement states.

12. The brake of claim 9, in combination with an electric motor.

13. The brake and electric motor of claim 12, wherein the brake and electric motor comprise a machine for an elevator system.

\* \* \* \* \*